(12) United States Patent
Zhu et al.

(10) Patent No.: US 10,268,850 B2
(45) Date of Patent: *Apr. 23, 2019

(54) DISTINCTIVE NOTICE FOR DIFFERENT SYMBOLOGY INFORMATION

(71) Applicant: METROLOGIC INSTRUMENTS, INC., Blackwood, NJ (US)

(72) Inventors: Xiaoxun Zhu, Marlton, NJ (US); Qian Mao, Jiangsu (CN)

(73) Assignee: METROLOGIC INSTRUMENTS, INC., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,725

(22) Filed: Mar. 13, 2018

(65) Prior Publication Data

US 2018/0204032 A1    Jul. 19, 2018

Related U.S. Application Data

(63) Continuation of application No. 15/447,487, filed on Mar. 2, 2017, now Pat. No. 9,922,219, which is a continuation of application No. 14/940,650, filed on Nov. 13, 2015, now Pat. No. 9,589,164, which is a continuation of application No. 13/805,009, filed as application No. PCT/CN2010/000928 on Jun. 24, 2010, now Pat. No. 9,189,669.

(51) Int. Cl.
| | |
|---|---|
| *G06K 7/10* | (2006.01) |
| *G06K 19/06* | (2006.01) |
| *G08B 3/10* | (2006.01) |
| *G08B 5/38* | (2006.01) |
| *G08B 6/00* | (2006.01) |
| *G06Q 10/00* | (2012.01) |

(52) U.S. Cl.
CPC ..... *G06K 7/10603* (2013.01); *G06K 7/10544* (2013.01); *G06K 7/10554* (2013.01); *G06K 19/06037* (2013.01); *G06Q 10/00* (2013.01); *G08B 3/10* (2013.01); *G08B 5/38* (2013.01); *G08B 6/00* (2013.01); *G06K 2007/10524* (2013.01)

(58) Field of Classification Search
CPC ....................................................... G06K 7/10
USPC .................................................. 235/462.01
See application file for complete search history.

(56) References Cited

U.S. PATENT DOCUMENTS

| | | |
|---|---|---|
| 3,792,437 A | 2/1974 | Blumenthal et al. |
| 3,959,624 A | 5/1976 | Kaslow |
| 4,002,886 A | 1/1977 | Sundelin |
| 4,359,631 A | 11/1982 | Lockwood et al. |
| 4,554,446 A | 11/1985 | Murphy et al. |
| 4,575,623 A | 3/1986 | Cononi et al. |

(Continued)

FOREIGN PATENT DOCUMENTS

| | | |
|---|---|---|
| CN | 1968169 A | 5/2007 |
| WO | WO2011160256 | 12/2011 |

*Primary Examiner* — Daniel A Hess
(74) *Attorney, Agent, or Firm* — Additon, Higgins & Pendleton, P.A.

(57) ABSTRACT

An indicia reader is adapted for hand held operation to read information bearing indicia (IBI) at a point of transaction (POT) and is operated by: configuring the indicia reader in a store to provide at least one store specific indicia read notice; reading an IBI at a POT with the indicia reader and providing the at least one store specific indicia read notice to a customer when each IBI is read.

20 Claims, 5 Drawing Sheets

(56) References Cited

U.S. PATENT DOCUMENTS

| | | |
|---|---|---|
| 4,654,482 A | 3/1987 | DeAngelis |
| 4,674,041 A | 6/1987 | Lemon et al. |
| 4,676,343 A | 6/1987 | Humble et al. |
| 4,679,154 A | 7/1987 | Blanford |
| 4,703,423 A | 10/1987 | Bado et al. |
| 4,772,769 A | 9/1988 | Shumate |
| 4,821,186 A | 4/1989 | Munakata et al. |
| 4,825,045 A | 4/1989 | Humble |
| 4,833,308 A | 5/1989 | Humble |
| 4,959,530 A | 9/1990 | O'Connor |
| 5,043,563 A | 8/1991 | Chi et al. |
| 5,120,943 A | 6/1992 | Benz |
| 5,198,644 A | 3/1993 | Pfeiffer et al. |
| 5,229,590 A | 7/1993 | Harden et al. |
| 5,260,554 A | 11/1993 | Grodevant |
| 5,262,628 A | 11/1993 | Shepard et al. |
| 5,268,823 A | 12/1993 | Yergenson |
| 5,397,867 A | 3/1995 | Demeo |
| 5,463,209 A | 10/1995 | Figh et al. |
| 5,539,193 A | 7/1996 | Gibbs et al. |
| 5,539,194 A | 7/1996 | Miller et al. |
| 5,543,610 A | 8/1996 | Bard et al. |
| 5,602,377 A | 2/1997 | Beller et al. |
| 5,632,010 A | 5/1997 | Briechle et al. |
| 5,640,193 A | 6/1997 | Wellner |
| 5,642,484 A | 6/1997 | Harrison, III et al. |
| 5,664,110 A | 9/1997 | Green et al. |
| 5,687,322 A | 11/1997 | Deaton et al. |
| 5,711,588 A | 1/1998 | Rudisill |
| 5,747,756 A | 5/1998 | Boedecker |
| 5,747,785 A | 5/1998 | Miller et al. |
| 5,748,904 A | 5/1998 | Huang et al. |
| 5,764,774 A | 6/1998 | Liu |
| 5,793,033 A | 8/1998 | Feng et al. |
| 5,801,371 A | 9/1998 | Kahn et al. |
| 5,804,803 A | 9/1998 | Cragun et al. |
| 5,806,071 A | 9/1998 | Balderrama et al. |
| 5,818,032 A | 10/1998 | Sun et al. |
| 5,848,064 A | 12/1998 | Cowan |
| 5,850,187 A | 12/1998 | Carrender et al. |
| 5,869,819 A | 2/1999 | Knowles et al. |
| 5,890,135 A | 3/1999 | Powell |
| 5,905,248 A | 5/1999 | Russell et al. |
| 5,905,251 A | 5/1999 | Knowles |
| 5,913,210 A | 6/1999 | Call |
| 5,917,175 A | 6/1999 | Miller et al. |
| 5,918,214 A | 6/1999 | Perkowski |
| 5,932,863 A | 8/1999 | Rathus et al. |
| 5,932,869 A | 8/1999 | Gottlich et al. |
| 5,933,829 A | 8/1999 | Durst et al. |
| 5,939,699 A | 8/1999 | Perttunen et al. |
| 5,940,595 A | 8/1999 | Reber et al. |
| 5,950,173 A | 9/1999 | Perkowski |
| 5,959,282 A | 9/1999 | Tabuchi |
| 5,971,277 A | 10/1999 | Cragun et al. |
| 5,977,901 A | 11/1999 | Fenner |
| 5,978,773 A | 11/1999 | Hudetz et al. |
| 5,979,757 A | 11/1999 | Tracy et al. |
| 5,979,764 A | 11/1999 | Swyst et al. |
| 5,979,773 A | 11/1999 | Findley, Jr. et al. |
| 5,992,752 A | 11/1999 | Wilz, Sr. et al. |
| 5,995,105 A | 11/1999 | Reber et al. |
| 5,995,888 A | 11/1999 | Hagenbuch |
| 6,006,118 A | 12/1999 | Stephenson |
| 6,012,102 A | 1/2000 | Shachar |
| 6,026,397 A | 2/2000 | Sheppard |
| 6,027,024 A | 2/2000 | Knowles |
| 6,034,379 A | 3/2000 | Bunte et al. |
| 6,045,048 A | 4/2000 | Wilz, Sr. et al. |
| 6,064,979 A | 5/2000 | Perkowski |
| 6,068,188 A | 5/2000 | Knowles |
| 6,076,070 A | 6/2000 | Stack |
| 6,076,071 A | 6/2000 | Freeny, Jr. |
| 6,108,656 A | 8/2000 | Durst et al. |
| 6,134,548 A | 10/2000 | Gottsman et al. |
| 6,147,767 A | 11/2000 | Petteruti et al. |
| 6,154,738 A | 11/2000 | Call |
| 6,176,427 B1 | 1/2001 | Antognini et al. |
| 6,189,790 B1 | 2/2001 | Walter |
| 6,199,048 B1 | 3/2001 | Hudetz et al. |
| 6,206,286 B1 | 3/2001 | Watanabe et al. |
| 6,208,980 B1 | 3/2001 | Kara |
| 6,213,394 B1 | 4/2001 | Schumacher et al. |
| 6,292,786 B1 | 9/2001 | Deaton et al. |
| 6,307,487 B1 | 10/2001 | Luby |
| 6,321,992 B1 | 11/2001 | Knowles et al. |
| 6,338,067 B1 | 1/2002 | Baker et al. |
| 6,343,101 B1 | 1/2002 | Dong et al. |
| 6,397,193 B1 | 5/2002 | Walker et al. |
| 6,401,074 B1 | 6/2002 | Sleeper |
| 6,412,699 B1 | 7/2002 | Russell et al. |
| 6,415,263 B1 | 7/2002 | Doss |
| 6,418,441 B1 | 7/2002 | Call |
| 6,430,554 B1 | 8/2002 | Rothschild |
| 6,434,561 B1 | 8/2002 | Durst, Jr. et al. |
| 6,484,146 B2 | 11/2002 | Day et al. |
| 6,510,997 B1 | 1/2003 | Wilz, Sr. et al. |
| 6,525,835 B1 | 2/2003 | Gulati |
| 6,529,146 B1 | 3/2003 | Kowalski et al. |
| 6,542,933 B1 | 4/2003 | Durst, Jr. et al. |
| 6,561,428 B2 | 5/2003 | Meier et al. |
| 6,564,189 B1 | 5/2003 | Nycz |
| 6,701,369 B1 | 3/2004 | Philyaw |
| 6,745,234 B1 | 6/2004 | Philyaw et al. |
| 6,764,011 B2 | 7/2004 | Entani |
| 6,834,804 B2 | 12/2004 | Rathus et al. |
| 6,854,651 B2 | 2/2005 | Smith et al. |
| 6,860,427 B1 | 3/2005 | Schmidt et al. |
| 6,873,435 B1 | 3/2005 | Tehranchi et al. |
| 6,902,114 B2 | 6/2005 | Hashimoto et al. |
| 6,969,002 B2 | 11/2005 | Creamer et al. |
| 6,976,062 B1 | 12/2005 | Denby et al. |
| 6,987,927 B1 | 1/2006 | Battaglia et al. |
| 7,055,737 B1 | 6/2006 | Tobin et al. |
| 7,075,676 B2 | 7/2006 | Owen |
| 7,121,470 B2 | 10/2006 | McCall et al. |
| 7,159,214 B2 | 1/2007 | Rajaram et al. |
| 7,207,491 B2 | 4/2007 | Lubow |
| 7,222,789 B2 | 5/2007 | Longacre, Jr. et al. |
| 7,337,317 B2 | 2/2008 | Meggitt et al. |
| 7,367,514 B2 | 5/2008 | Soule, III et al. |
| 7,451,917 B2 | 11/2008 | McCall et al. |
| 7,472,825 B2 | 1/2009 | Fitch et al. |
| 7,523,866 B2 | 4/2009 | Longacre, Jr. et al. |
| 7,717,342 B2 | 5/2010 | Wang |
| 7,748,620 B2 | 7/2010 | Gomez et al. |
| 9,189,669 B2 * | 11/2015 | Zhu ............ G07G 1/0081 |
| 9,589,164 B2 * | 3/2017 | Zhu ............ G06K 7/10544 |
| 9,922,219 B2 * | 3/2018 | Zhu ............ G06K 7/10544 |
| 2001/0037266 A1 | 11/2001 | Schroeder |
| 2001/0047428 A1 | 11/2001 | Hunter |
| 2001/0051915 A1 | 12/2001 | Ueno et al. |
| 2002/0004753 A1 | 1/2002 | Perkowski |
| 2002/0042736 A1 | 4/2002 | Wang et al. |
| 2002/0049607 A1 | 4/2002 | Perkowski |
| 2002/0066095 A1 | 5/2002 | Yu |
| 2002/0070278 A1 | 6/2002 | Hung et al. |
| 2002/0081038 A1 | 6/2002 | Moule |
| 2002/0104884 A1 | 8/2002 | Meier et al. |
| 2002/0128859 A1 | 9/2002 | Perkowski |
| 2002/0150245 A1 | 10/2002 | Sugimoto et al. |
| 2002/0165931 A1 | 11/2002 | Greer et al. |
| 2002/0169687 A1 | 11/2002 | Perkowski |
| 2003/0009392 A1 | 1/2003 | Perkowski |
| 2003/0048882 A1 | 3/2003 | Smith, II |
| 2003/0136841 A1 | 7/2003 | Alleshouse |
| 2003/0228063 A1 | 12/2003 | Nakayama et al. |
| 2004/0149826 A1 | 8/2004 | Alleshouse |
| 2004/0194081 A1 | 9/2004 | Qumei et al. |
| 2005/0005102 A1 | 1/2005 | Meggitt et al. |
| 2005/0039052 A1 | 2/2005 | O'Donnell et al. |
| 2005/0039092 A1 | 2/2005 | Soule, III et al. |
| 2005/0165784 A1 | 7/2005 | Gomez et al. |
| 2005/0167504 A1 | 8/2005 | Meier et al. |

(56) References Cited

U.S. PATENT DOCUMENTS

| | | |
|---|---|---|
| 2007/0080229 A1 | 4/2007 | Longacre, Jr. et al. |
| 2007/0152058 A1 | 7/2007 | Yeakley et al. |
| 2007/0267501 A1 | 11/2007 | Jovanovski et al. |
| 2008/0121715 A1 | 5/2008 | Field |
| 2008/0179403 A1 | 7/2008 | Endlebardt et al. |
| 2008/0203167 A1 | 8/2008 | Soule et al. |
| 2008/0267208 A1 | 10/2008 | Sevier |
| 2009/0200380 A1 | 8/2009 | Longacre, Jr. et al. |
| 2010/0090006 A1 | 4/2010 | Gomez et al. |

* cited by examiner

DISTINCTIVE NOTICE FOR DIFFERENT SYMBOLOGY INFORMATION

CROSS-REFERENCE TO RELATED APPLICATIONS

The present application claims the benefit of U.S. patent application Ser. No. 15/447,487 for Distinctive Notice for Different Symbology Information filed Mar. 2, 2017 (and published Aug. 3, 2017 as U.S. Patent Application Publication No. 2017/0220833), now U.S. Pat. No. 9,922,219, which claims the benefit of U.S. patent application Ser. No. 14/940,650 for Distinctive Notice for Different Symbology Information filed Nov. 13, 2015 (and published Mar. 10, 2016 as U.S. Patent Publication No. 2016/0070943), now U.S. Pat. No. 9,589,164, which claims the benefit of U.S. patent application Ser. No. 13/805,009 for Distinctive Notice for Different Symbology Information filed Dec. 18, 2012 (and published Apr. 11, 2013 as U.S. Patent Publication No. 2013/0087618), now U.S. Pat. No. 9,189,669, which claims the benefit of International Application No. PCT/CN2010/000928 for Distinctive Notice for Different Symbology Information filed Jun. 24, 2010 (and published Dec. 29, 2011 as WIPO Publication No. WO 2011/160256). Each of the foregoing patent applications, patent publications, and patents is hereby incorporated by reference in its entirety.

FIELD OF THE INVENTION

The present invention relates to indicia reading devices, and more particularly to an indicia reader having distinctive notice for different symbology information.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance, one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation, and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Efforts regarding such systems have led to continuing developments to improve their versatility, practicality, and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Exemplary methods may be conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs." "objects." "functions." "subroutines," "libraries," ".dlls." "APIs." and "procedures." While one or more of these terms may find favor in the present description, there is no intention to limit the invention to the described configurations.

In general, the sequences of steps in the present methods require physical manipulation of physical quantities. These quantities take the form of optical, electrical, or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor) but may also be implemented in a hardware processor. For example, the methods may be implemented with HDL (Hardware Design Language) in an ASIC.

Figure 1:
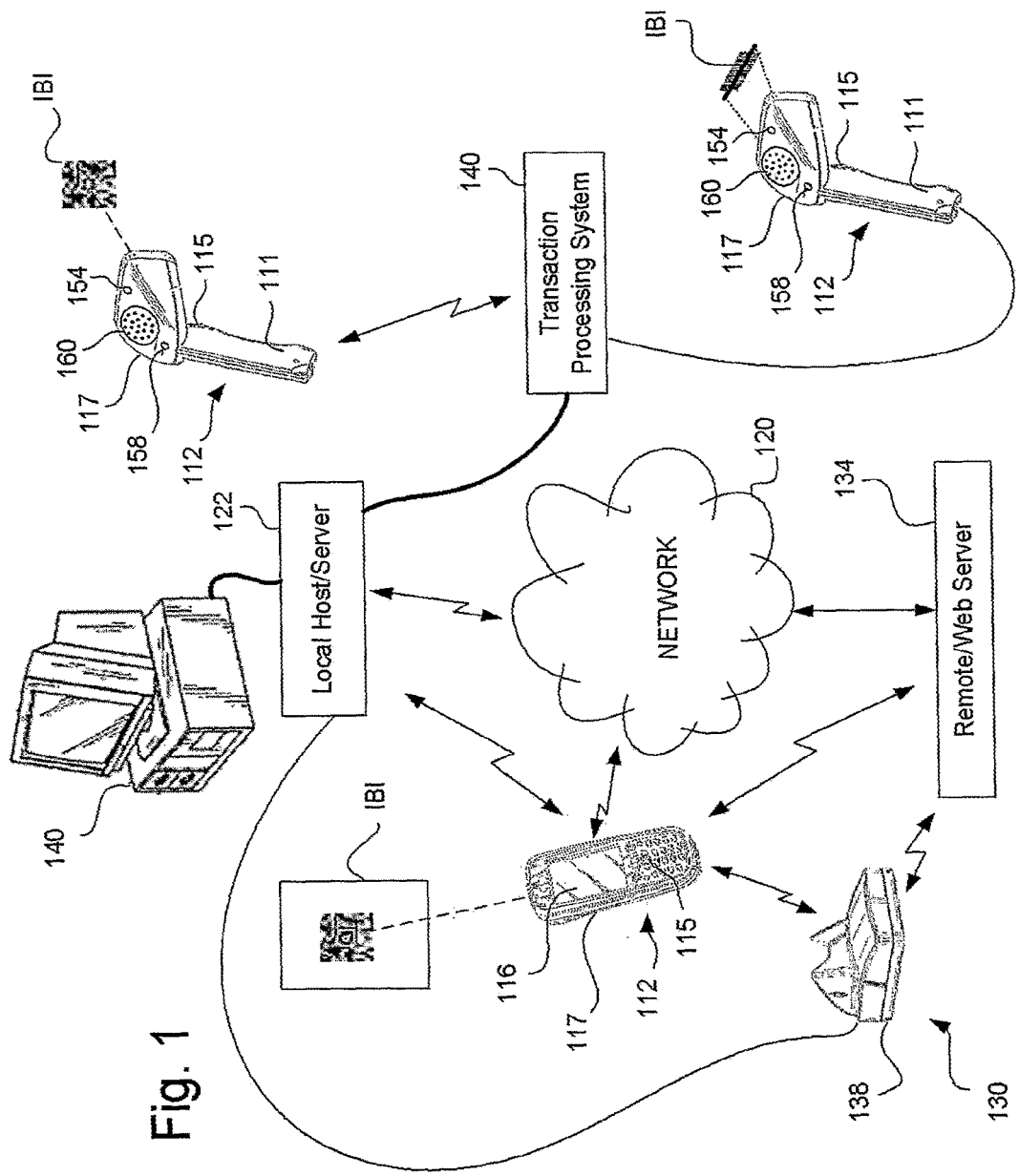
FIG. 1 is a block diagram of an exemplary indicia reader system.

FIG. 1 illustrates an exemplary scanning system configuration, wherein a plurality of indicia readers 112 are operated and utilized where information bearing indicia (IBI) are present. The indicia readers may be either stationary or hand-held and may be either laser indicia reading devices (or laser scanners) utilizing transmitted laser light or optical indicia reading devices utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet.

An exemplary indicia reader 112 may have a number of subsystems supported by a housing 117 configured to be hand held, such as by utilization of a handle portion 111. An exemplary indicia reader 112 may have a number of feedback subsystems for providing an operator with feedback as to operation or functionality of the reader. Exemplary indicia reader feedback subsystems may be a display 116 for providing visual feedback, a LED 154 for providing visual feedback, a beeper 158 for providing audio feedback or a speaker 160 for providing audio feedback.

A speaker is a device for converting electrical energy into acoustical (sound) signal energy that is radiated into a room or open air. The part of the speaker that converts electrical energy into mechanical energy is referred to as the motor, or voice coil. The motor vibrates a diaphragm that vibrates the air in immediate contact with it, producing a sound wave corresponding to a pattern of original speech, music, or other acoustic signal. Speakers have volume and tone control to allow a user to vary the volume, quantity, and quality of sounds. Speakers typically have a relatively flat output frequency response over a frequency range from 500 to 10,000 Hz and are suitable for providing audio feedback.

A beeper or sounder is an electroacoustic transducer that converts electrical energy into mechanical energy to emit a more limited volume, quantity, and quality of sounds than a speaker. Beepers have less controllability than speakers. Beepers typically have an erratic output frequency response over a frequency range from 500 to 6000 Hz which drops off dramatically at 6000 Hz and is not suitable for providing audio feedback other than simple tones. A typical usage of a beeper is to provide audio feedback of a successful read or an error condition. If the beeper is used to indicate an error condition, only one error tone is used for every kind of error and therefore does not provide good feedback to the operator as to the cause of the error condition. An exemplary beeper is part number MLT-03GC manufactured by Star Micronics.

Exemplary indicia readers may be in communication (wired or wireless) to a local transaction processing system 140, such as a cash register, store station or employee station or local host/server 122 directly or through a charging station or base 138. An exemplary local server 122 or indicia reader 112 may be in communication with network 120 and or a remote/web server 134.

Figure 2:
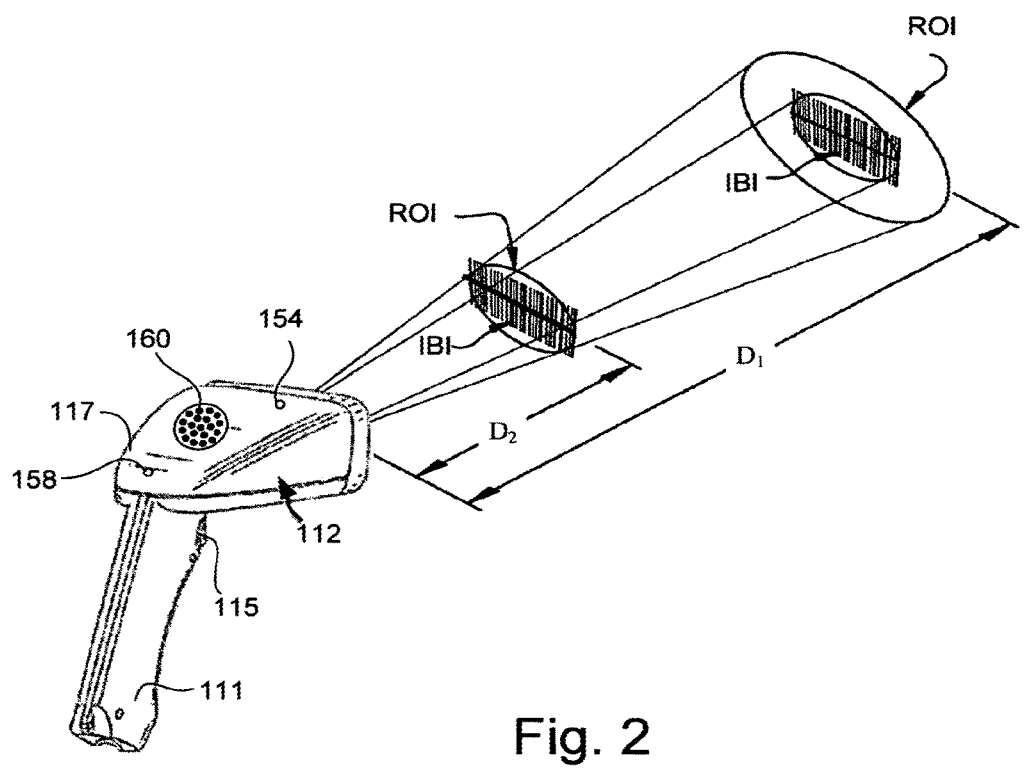
FIG. 2 is a perspective view of an exemplary indicia reader scanning near and far indicia.

FIG. 2 illustrates an exemplary indicia reader 112 configured to scan an IBI located a first distance D1 from the reader in a far scan mode and scan an IBI located a second closer distance D2 from the reader in a near scan mode, wherein the reader alternates scanning in the near and far scan modes with successive pulls on the trigger 115 or pushes on a button.

Figure 3:
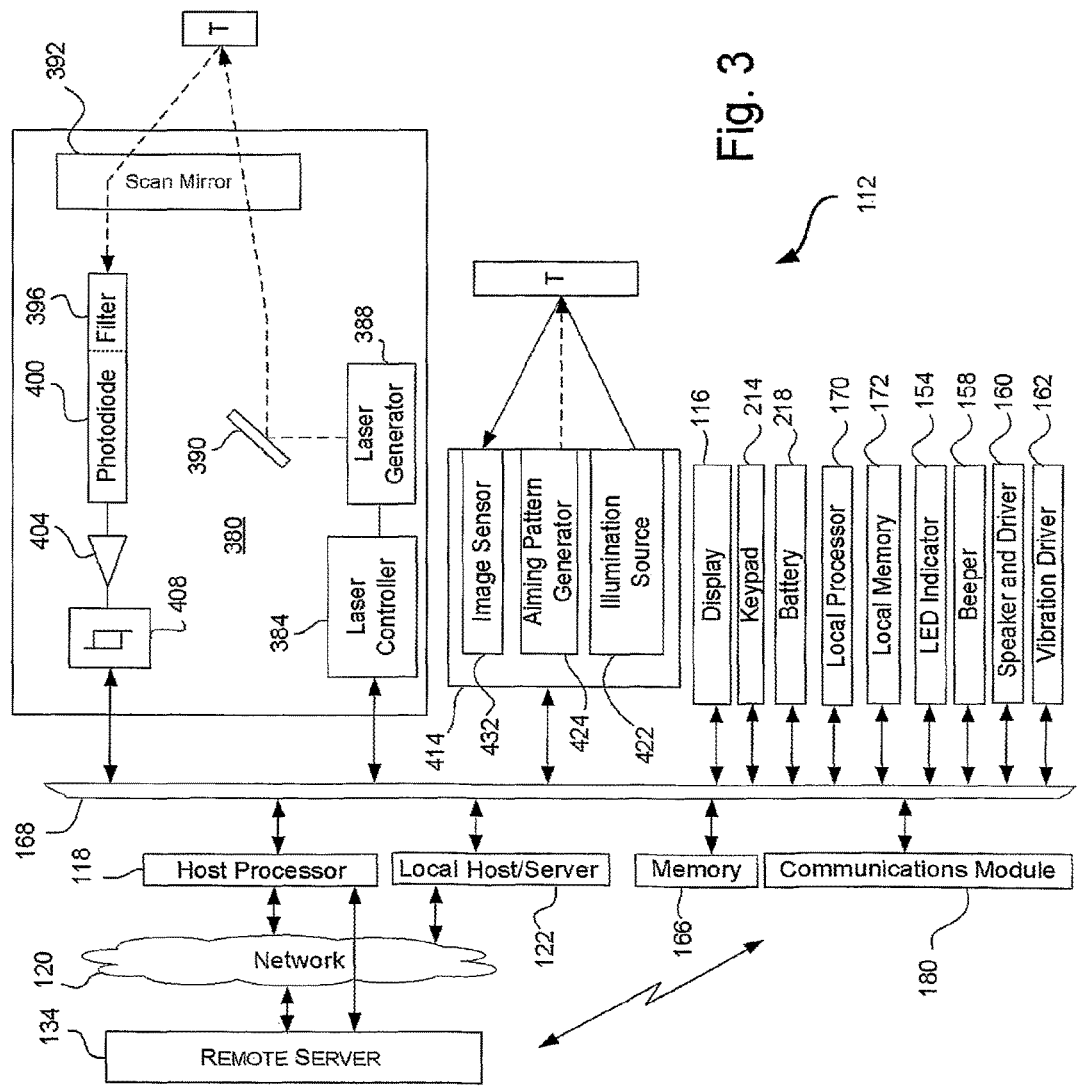
FIG. 3 is a simplified schematic block diagram of an exemplary indicia reader.

FIG. 3 illustrates an exemplary indicia reader 112 may comprise a number of exemplary subsystems, such as laser scan engine 380 or laser scanning reader system for reading indicia on a target T. The laser scanning reader system may comprise a laser controller 384 for controlling a laser generator 388 for generating a laser light beam which is directed onto a folding mirror 390 which then directs the laser light beam to an oscillating or rotating scan mirror 392 to project a scanning pattern onto target T. The laser scanning pattern is reflected off of the target and redirected by scan mirror 392 into a receive path comprising a laser light pass filter 396, a photodiode 400, an amplifier 404 and a digitizer 408.

Laser light may be described as a spatially coherent, narrow low-divergence beam of light.

Digitizer 408 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream, including decoding of IBIs.

An exemplary indicia reader 112 may comprise one or more optical image engines (image indicia reader systems or optical scan engines) 414 for reading indicia on a target T. Optical image engines capture and read images to detect and decode IBIs located within the captured images. The optical image indicia reader systems may comprise one or more illumination source(s) 422 for illuminating an IBI with a beam or pattern of incoherent light in the form of an illumination pattern, an image sensor 432 for converting light reflected off a target T having an IBI provided thereon into representative output signals thereof and an aiming pattern generator 424 for projecting an aiming pattern on the target. The output signal of the image sensor may be processed utilizing one or more functions or algorithms to condition the signal appropriately for use in further processing downstream, including decoding of IBIs.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The imager may be either a progressive or interleaved imager. The image sensor may contain an array of light sensitive photodiodes (or pixels) that convert incident light energy into electric charge. Many solid state image sensors also allow regions of a full frame of image data to be addressed.

Other exemplary reader subsystems or components supported by the housing may include one or more local or on board processor(s) 170, local memory 172, a battery 218, a display 116, a key pad 214, and a wireless communications module 180. The subsystems may communicate via one or more bus 168, data lines or other signal or data communication form. The indicia reader may communicate with one or more local processor(s) 118, a local host/server 122, local memory 166, network 120, or remote server host/server 134.

Indicia reader 112 may have a number of feedback subsystems for providing an operator with feedback as to operation or functionality of the reader. Exemplary indicia reader feedback subsystems may be a display 116 for providing visual feedback, a LED 154 for providing visual feedback, a beeper 158 for providing audio feedback or a speaker 160 for providing audio feedback and a vibration driver 162 for providing tactile feedback.

Communications module 180 may provide a communication link from imaging reader 112 to other indicia readers or to other systems such as a server/remote processor 134.

The processor(s) may be located on board or within the housing with other subsystems. The particulars of the functionality of the processor(s) and the reader may be determined by or based upon configuration settings or data which may be stored in firmware, remote or local memory. Configuration settings may be arranged as parameter tables.

An exemplary processor may be a mixed-signal array with on-chip controller devices designed to replace multiple traditional MCU-based system components with one single-chip programmable device. It may include configurable blocks of analog and digital logic, as well as programmable interconnects.

The reader subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon configuration settings stored in firmware or memory which may be any one of a number of memory types such as RAM, ROM, EEPROM, etc. In addition, some memory functions may be stored in memory provided as part of the processor(s).

Exemplary functions of the processor(s) may be controlling operation the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal. The processor(s) may be located on board or within the housing with other subsystems.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use. Two exemplary scanning modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the reader in discontinuous mode is via hand held operation. Decoding stops once the indicia reader is no longer triggered. The discontinuous mode is typically initiated because the operator knows a symbol is present.

Exemplary indicia readers may use memory or firmware to store reader settings or reader configuration settings. Exemplary configuration settings may be selection of scanning distance, trigger functionality, pre-defined bar code output data based on the scan input, continuous scanning mode, discontinuous scanning mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, speaker functionality, speaker control, beeper functionality, notification LED functionality etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

At predetermined time intervals a host system may broadcast various information, such as firmware revision, configuration settings, etc. The host may then download the newer files and update readers during a time of inactivity. Readers may use on board memory or firmware flash memory to store configuration settings.

Readers may be configured via serial connection using serial commands. A GUI interface may be utilized for creating or reading serial commands, such as Visual Menu or similar such product. This may be done locally or remotely by connecting the optical reader either directly or through a network (such as the internet) to a remote computer and having the remote computer provide software upgrades.

Software upgrades may be necessary for migration from one reader to new or other readers, possibly different manufacturers. Upgrading may be simplified if the configuration of the reader being replaced is matched or matches the configuration of the equipment that it is replacing.

If reader software is replaced, the reader may have the ability to automatically read out configuration settings information in memory and allow the software to adapt and use different methods of control, or different methods of decoding, etc.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Another exemplary embodiment may be to provide a PC based software tool that analyzes output scanned data of a known information bearing indicia from a target reader (the one being replaced) and compares it with the output scanned data from the replacement reader. The software tool may interpret how the existing device is configured based on the difference between the two sets of scanned data. After interpolation of the configuration settings of the replacement reader, the software tool would configure the replacement reader to match the old or replacement reader. This may be considered indirect mapping, wherein the software tool interpolates the inner settings of an existing device from its operation, rather than by direct read out from memory or firmware.

Either exemplary embodiment may be integrated with a cross-browser, client-side DHTML menu builder such as Visual Menu. The configuration of a reader may be read out once and then propagated many times using wireless or over-the-net configuration utilities, hard copy or video display menuing or other suitable means.

A user may update or replace one or more configuration settings or configuration setting data utilizing a remote updating system which may be done by connecting the reader either directly or through a network (such as the internet) to a remote processor. With appropriate software, the remote processor may be programmed to read configuration settings from the reader, such as software configuration. The remote processor may read the configuration setting data and utilize that data when downloading updates or new software. An operator may request from the remote processor for a software update. The request would be received by either computer, which could read the current software configuration resident on the optical reader and determine the appropriate update or replacement software.

In an exemplary embodiment, an indicia reader may be configured by reading IBIs from a user's application to configure the reader for setup in their application.

Communications module 180 may provide a communication link from imaging reader 112 to other indicia readers or to other systems such as a server/remote processor 134.

An exemplary processor may be a mixed-signal array with on-chip controller devices designed to replace multiple traditional MCU-based system components with one single-chip programmable device. It may include configurable blocks of analog and digital logic, as well as programmable interconnects.

The reader subsystems in the reader may be connected by one or more bus 168, data lines or other signal or data communication form. Exemplary forms may be an Inter-IC bus such as a two wire interface (TWI), dedicated data bus, RS232 interface, USB, etc.

Figure 4:
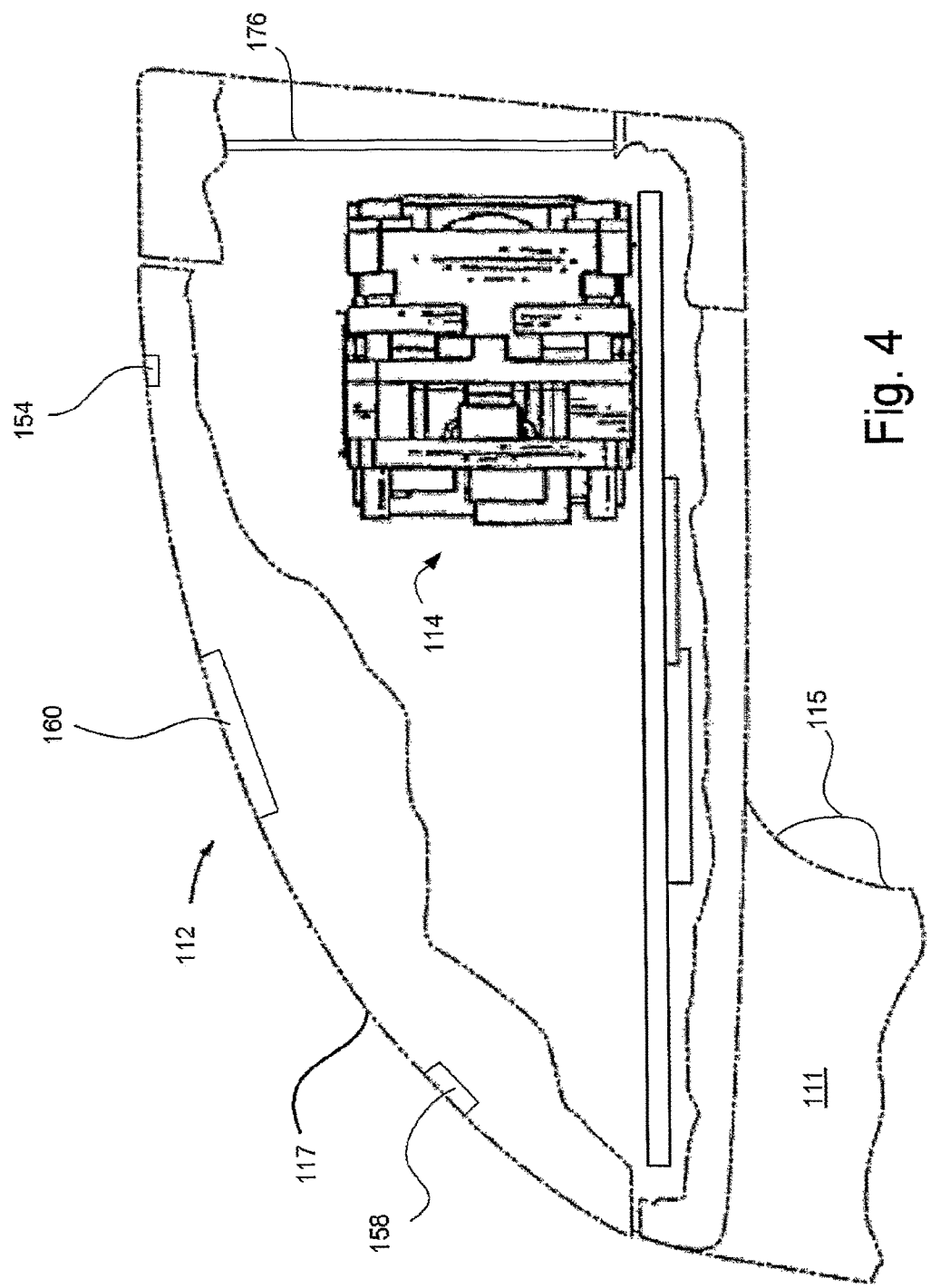
FIG. 4 is a fragmentary partially cutaway side view of an exemplary indicia reader.

Referring to FIG. 4, an exemplary indicia reader 112 includes an imaging assembly 114, a LED 154, a beeper 158 and a speaker 160 supported by a housing 117. A transparent window 176 protects the imaging assembly 114 and is integral with the housing.

In an exemplary embodiment, the indicia reader may identify particular barcodes according to rules defined by an establishment, such as a store to provide store customers distinctive and perceivable barcode read notices which may be customized as desired. A notice may be received once a targeted barcode is scanned for fast identification of the particular barcodes. The customer may easily get scan information in a perceivable way.

An exemplary use of an indicia reader is as the primary or sole scanner at a customer point of transaction (POT) in an establishment. Primary may mean the scanner at a POT is used to scan or image items more often than any other scanner or imager at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

As the primary scanner, merchandise with indicia may be read by it so that data decoded therefrom may be used for a stock keeping system (such as SKU) functionality such as sales, price look up, inventory, etc.

The perceptible read notices may be defined by rules defined by stores based on the information encoded in the barcode and may be established by conditions such as particular types of barcodes, one or several special barcodes, country information encoded in barcodes, etc. Any condition based on information encoded in the barcode may be used as a notice rule. Notice rules may be defined by more than one condition.

Read notices inform customers if a targeted barcode is scanned or not and may be customized to please customers. Examples of read notices are distinctive beeper tones, customized music, a distinctive LED blink mode, a vibration with a special period, etc. Software defining the read notice rules may be downloaded from a host processor, a network, other scanners, etc.

In an exemplary embodiment, an indicia reader is provided with an audio speaker driven by a programmable electrical audio signal wherein the reader stores audio messages within memory. Different barcodes would cause the processor to send different audio messages to the speaker to be broadcast by the speaker to provide audio voice synthesized information. An exemplary speaker is part number SCG-16A manufactured by Star Micronics.

In an exemplary embodiment, message and speaker operational settings may be part of the configuration settings, which may be changed by a store post manufacturing of the reader or changed at a POT by a customer.

Exemplary distinctive audio messages for a read notice may be the price of the item bearing the barcode, the item description, item on sale notification, item on sales savings information, etc. For example, the reader may be configured to provide a distinctive notice when an item on sale has been scanned to notify a customer that he is saving money.

In an exemplary embodiment, a store creates one or more store specific scanner notice configuration setting profiles in a host server and downloads those profiles to scanners in communication with the host server.

In an exemplary embodiment, a store creates a store specific scanner notice configuration setting profile in one scanner and then uploads that profile to a host server to download to other scanners in communication with the host server.

In an exemplary embodiment, a store creates a store specific scanner notice configuration setting profile in one scanner and then uploads that profile to other scanners in communication with the host server using the host server as the conduit for the upload.

In an exemplary embodiment, a store creates a store specific scanner notice configuration setting profile in one scanner and then wirelessly uploads that profile to other scanners in wireless communication with the updated scanner.

In an exemplary embodiment, a store stores in a host server profiles for customers, including scanner configuration settings defining customer specific scanner rules. The store provides at a POT a data reader for obtaining information (such as identification) from an information bearing medium, such as a card having a magnetic strip (mag strip) or symbol indicia (such as one or two dimensional symbologies), an RFID instrument, biometric information such as a fingerprint, etc., and a customer presents an identification bearing instrument at the POT to be read by the data reader. Once the customer is identified at the POT, the store may download to the scanner at the POT configurations settings to provide the user distinctive notices when barcodes are scanned at that POT. For example, the scanner may be configured to provide product identification and/or price information for each scanned barcode in a language specific to that customer, such as Spanish, German, Chinese, etc. Other customer specific configurations may be the pitch, volume, voice gender, type of music, etc. of the audible feedback.

In an exemplary embodiment, the operator is provided feedback or alerted from a combination of the audible message and a beeper sound or a LED indicator or a displayed message on a reader display. In an exemplary embodiment, the LED indicator may provide different color illumination dependent on the barcode being read.

Figure 5:
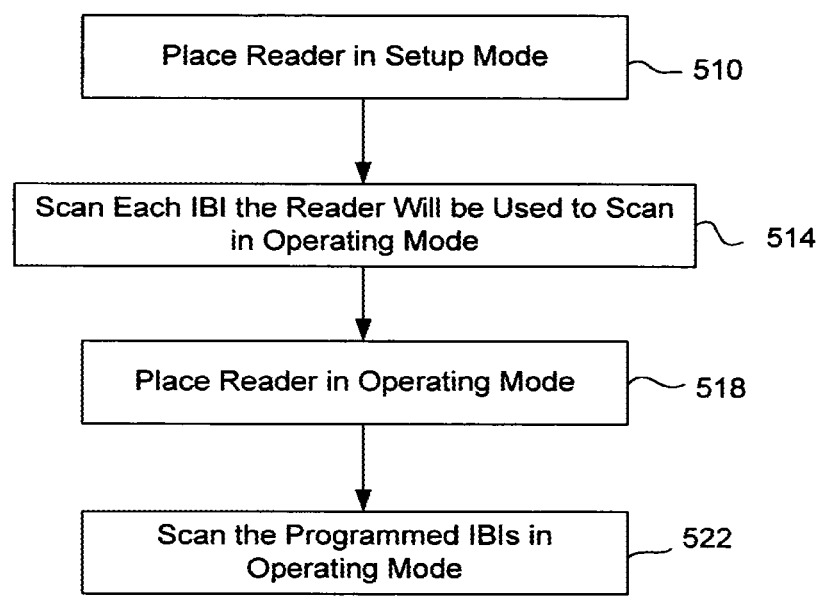
FIG. 5 is an exemplary flowchart for operating an indicia reader.

In an exemplary embodiment, indicia reader read notices may be configured by reading IBIs from a user's application to configure readers to provide distinctive notices for the barcodes read. Referring to FIG. 5, an exemplary method of configuring an indicia reader from a user's application comprises a user scanning a menuing symbology or communicating to the reader via an interface (wired or wireless) to put the scanner in a "set up" mode in a step 510. The set up mode configures the reader to permit decoding of a set N number of symbologies. The size of set N should be large enough to permit the user to scan all bar codes that the operator wishes to be part of his scanning application. A menuing symbology is an indicia bearing information medium which is used for programming or configuring a reader rather than for extracting product data.

In a step 514, the user scans symbologies that will be part of his application, that is, the symbologies that the user will want to scan when the reader is operational.

The codes scanned in the set up mode are not menuing symbologies, but actual user usage data symbologies the user wishes to be able to scan in their application while the scanner is in a usage or operational mode. A set of configuration settings are being created based on the symbologies being scanned during step 514 and may include all information which may be extracted from the scanning and decoding of the bar code, such as symbology types, lengths, size, or other potentially useful data.

Once the user is done scanning the sample codes, he would scan a menu bar code, or communicate to the reader via the interface in a step 522 to have the reader come out of the "set up" mode and into the use or operating mode. At this time, the reader may take the configurations that were created based on the bar codes scanned and store them in the reader memory. The data collected during the set up mode may be used to provide distinctive and perceivable barcode read notices, restrict the lengths of bar codes decoded (making sure only the length ranges of a given symbology which were seen in the "set up" mode are allowed to read), tune the aggressiveness of our decoding based on the size/resolution of the bar codes, enable the reader to read only those symbologies scanned, etc. In an exemplary embodiment, the number of enabled symbologies is less (N-X) in the operational mode than the set up mode.

This exemplary procedure requires no user understanding of bar code symbologies, or any characteristics which go along with them.

Additional configuration settings that may be input to compliment the set up scanned symbologies may be instructions to effectuate check characters, append modes and other decoding peripherals.

A method of configuring indicia readers is described in commonly owned U.S. Pat. No. 7,077,321 entitled POR- TABLE AUTODISCRIMINATING OPTICAL READER, the entirety of which is hereby incorporated herein by reference.

It should be understood that the programs, processes, methods, and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method, comprising:
reading a symbol with an indicia reader; and
providing a symbol-specific read notice for the symbol;
wherein the symbol-specific read notice for the symbol is based on information encoded in the symbol; and
wherein the symbol-specific read notice comprises distinctive beeper tones, customized music, a distinctive LED blink mode, and/or a vibration with a special period.

2. The method of claim 1, wherein the symbol-specific read notice comprises a distinctive beeper tone.

3. The method of claim 1, wherein the symbol-specific read notice informs a user if the symbol is scanned or not.

4. The method of claim 1, wherein the symbol-specific read notice is defined by rules defined by a store based on the information encoded in the symbol.

5. The method of claim 1, comprising configuring the indicia reader at a point of transaction to provide the symbol-specific read notice for the symbol.

6. The method of claim 1, comprising configuring the indicia reader at a point of transaction to provide the symbol-specific read notice for the symbol by reading a symbol carried by a user.

7. The method of claim 1, wherein the symbol-specific read notice comprises at least one of the following: a price of an item bearing the symbol; a description of an item bearing the symbol; an item on sale notification; and sales savings information.

8. The method of claim 1, comprising:
creating a symbol-specific read notice configuration setting profile; and
downloading the symbol-specific read notice configuration setting profile to the indicia reader.

9. The method of claim 8, comprising:
creating the symbol-specific read notice configuration setting profile in a first indicia reader;
uploading the symbol-specific read notice configuration setting profile to a host server; and
downloading the symbol-specific read notice configuration setting profile to another indicia reader in communication with the host server.

10. The method of claim 8, comprising:
creating the symbol-specific read notice configuration setting profile in a first indicia reader; and
uploading the symbol-specific read notice configuration setting profile to another indicia reader in communication with the first indicia reader.

11. The method of claim 8, comprising:
creating the symbol-specific read notice configuration setting profile by reading a symbol carried by a user, wherein the symbol-specific read notice configuration setting profile comprises a language; and
configuring the indicia reader to provide the symbol-specific read notice in the language.

12. An indicia reader, comprising:
an indicia reading assembly for reading a symbol;
a notification device for providing a notification when a symbol is read;
a memory storing program instructions; and
a processor for executing the program instructions, wherein, when the processor executes the program instructions, the indicia reader:
reads a symbol with the indicia reading assembly;
provides a symbol-specific read notice for the symbol with the notification device;
wherein the symbol-specific read notice for the symbol is based on information encoded in the symbol; and
wherein the symbol-specific read notice comprises distinctive beeper tones, customized music, a distinctive LED blink mode, and/or a vibration with a special period.

13. The indicia reader of claim 12, wherein the program instructions are stored onto the memory at a point of transaction.

14. The indicia reader of claim 12, wherein, when the processor executes the program instructions, the indicia reader is configured to provide the symbol-specific read notice for the symbol in response to reading a symbol carried by a user.

15. The indicia reader of claim 12, wherein the symbol-specific read notice comprises at least one of the following: a price of an item bearing the symbol; a description of an item bearing the symbol; an item on sale notification; and sales savings information.

16. The indicia reader of claim 12, wherein, when the processor executes the program instructions, the indicia reader acquires a configuration setting from a host server to determine the symbol-specific read notice.

17. The indicia reader of claim 12, wherein, when the processor executes the program instructions, the indicia reader acquires a configuration setting from another indicia reader to determine the symbol-specific read notice.

18. The indicia reader of claim 12, wherein:
the symbol-specific read notice configuration setting profile comprises a language; and
when the processor executes the program instructions, the indicia reader is configured to provide the symbol-specific read notice in the language for the symbol in response to reading a symbol carried by a user.

19. The indicia reader of claim 12, wherein the symbol-specific read notice comprises a distinctive beeper tone.

20. The indicia reader of claim 12, wherein the symbol-specific read notice informs a user if the symbol is scanned or not.

* * * * *